United States Patent
Kim et al.

(10) Patent No.: US 10,015,641 B2
(45) Date of Patent: Jul. 3, 2018

(54) METHOD AND APPARATUS FOR CONFIGURING MBMS MDT FOR MULTIPLE MBSFN AREAS IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/121,912

(22) PCT Filed: Mar. 10, 2015

(86) PCT No.: PCT/KR2015/002271
§ 371 (c)(1),
(2) Date: Aug. 26, 2016

(87) PCT Pub. No.: WO2015/141976
PCT Pub. Date: Sep. 24, 2015

(65) Prior Publication Data
US 2017/0019772 A1    Jan. 19, 2017

Related U.S. Application Data

(60) Provisional application No. 61/953,749, filed on Mar. 15, 2014, provisional application No. 61/954,562, filed on Mar. 17, 2014.

(51) Int. Cl.
*H04W 72/00* (2009.01)
*H04W 4/06* (2009.01)
(Continued)

(52) U.S. Cl.
CPC ............ *H04W 4/06* (2013.01); *H04W 24/10* (2013.01); *H04W 72/005* (2013.01);
(Continued)

(58) Field of Classification Search
CPC ..... H04W 4/06; H04W 24/10; H04W 72/042; H04W 72/0446; H04W 72/005; H04W 76/002
See application file for complete search history.

(56) References Cited

U.S. PATENT DOCUMENTS

2011/0201279 A1* 8/2011 Suzuki .................. H04W 24/10
455/67.11
2012/0281610 A1* 11/2012 Ai ......................... H04W 8/205
370/312
(Continued)

FOREIGN PATENT DOCUMENTS

WO      2012093875 A2    7/2012
WO      2012148203 A2   11/2012
(Continued)

*Primary Examiner* — Jamal Javaid
(74) *Attorney, Agent, or Firm* — Lee Hong Degerman Kang Waimey

(57) ABSTRACT

A method and apparatus for configuring multimedia broadcast multicast service (MBMS) minimization of drive test (MDT) in a wireless communication system is provided. A user equipment (UE) receives a representative multicast control channel (MCCH) indicator from a network, and receives a MBMS-MDT configuration on a representative MCCH, which is indicated by the representative MCCH indicator, among multiple MCCHs from the network. Thereafter, the UE performs MBMS-MDT based on the received MBMS-MDT configuration.

13 Claims, 13 Drawing Sheets

(51) Int. Cl.
  *H04W 24/10* (2009.01)
  *H04W 72/04* (2009.01)
  *H04W 76/40* (2018.01)
  *H04L 12/18* (2006.01)
  *H04W 4/90* (2018.01)

(52) U.S. Cl.
  CPC ......... *H04W 72/042* (2013.01); *H04W 76/40* (2018.02); *H04L 12/189* (2013.01); *H04W 4/90* (2018.02)

(56) References Cited

U.S. PATENT DOCUMENTS

2013/0128756 A1* 5/2013 Zhang .................. H04W 24/10
  370/252
2013/0176923 A1* 7/2013 Liu ........................ H04W 4/20
  370/311

FOREIGN PATENT DOCUMENTS

| WO | 2013051834 A1 | 4/2013 |
| WO | 2014017792 A1 | 1/2014 |

\* cited by examiner

METHOD AND APPARATUS FOR CONFIGURING MBMS MDT FOR MULTIPLE MBSFN AREAS IN WIRELESS COMMUNICATION SYSTEM

CROSS-REFERENCE TO RELATED APPLICATIONS

This application is the National Stage filing under 35 U.S.C. 371 of International Application No. PCT/KR2015/002271, filed on Mar. 10, 2015, which claims the benefit of U.S. Provisional Application No. 61/953,749, filed on Mar. 15, 2014 and 61/954,562, filed on Mar. 17, 2014, the contents of which are all hereby incorporated by reference herein in their entirety.

BACKGROUND OF THE INVENTION

Field of the Invention

The present invention relates to wireless communications, and more particularly, to a method and apparatus for configuring multimedia broadcast multicast service (MBMS) minimization of drive test (MDT) for multiple multicast-broadcast single-frequency network (MBSFN) areas in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Minimization of drive tests (MDT) is a feature introduced in 3GPP LTE rel-10 to allow the harvesting of network coverage and quality information from customer user equipments (UEs) as they move within the coverage of the radio access network (RAN).

This provides better quality data, at a lower cost, than that produced by the RAN operator performing drive testing of the RAN using test UEs.

The concept of MDT may be applied to MBMS, which may be referred to as MBMS-MDT. That is, for a user equipment (UE) which is interested to receive MBMS or is receiving MBMS, MDT may be configured and performed.

For configuration of MBMS-MDT, MBMS-MDT configuration may be provided by a network. The MBMS-MDT configuration may be provided by various methods, and according to the method for providing the MBMS-MDT configuration, a method for configuring MBMS-MDT may be defined differently.

SUMMARY OF THE INVENTION

The present invention provides a method and apparatus for configuring multimedia broadcast multicast service (MBMS) minimization of drive test (MDT) for multiple multicast-broadcast single-frequency network (MBSFN) areas in a wireless communication system. The present invention provides a method for configuring representative multicast control channel (MCCH) for MBMS-MDT configuration. The present invention provides a method for receiving a representative MCCH indicator for indicating the representative multicast control channel (MCCH).

In an aspect, a method for configuring, by a user equipment (UE), multimedia broadcast multicast service (MBMS) minimization of drive test (MDT) in a wireless communication system is provided. The method includes receiving a representative multicast control channel (MCCH) indicator from a network, receiving a MBMS-MDT configuration on a representative MCCH, which is indicated by the representative MCCH indicator, among multiple MCCHs from the network, and performing MBMS-MDT based on the received MBMS-MDT configuration.

In another aspect, a user equipment (UE) configured to configure multimedia broadcast multicast service (MBMS) minimization of drive test (MDT) in a wireless communication system is provided. The UE includes a radio frequency (RF) unit configured to transmit or received a radio signal, and a processor coupled to the RF unit, and configured to receive a representative multicast control channel (MCCH) indicator from a network, receive a MBMS-MDT configuration on a representative MCCH, which is indicated by the representative MCCH indicator, among multiple MCCHs from the network, and perform MBMS-MDT based on the received MBMS-MDT configuration.

MBMS-MDT can be configured efficiently for multiple MBSFN areas via MCCH.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
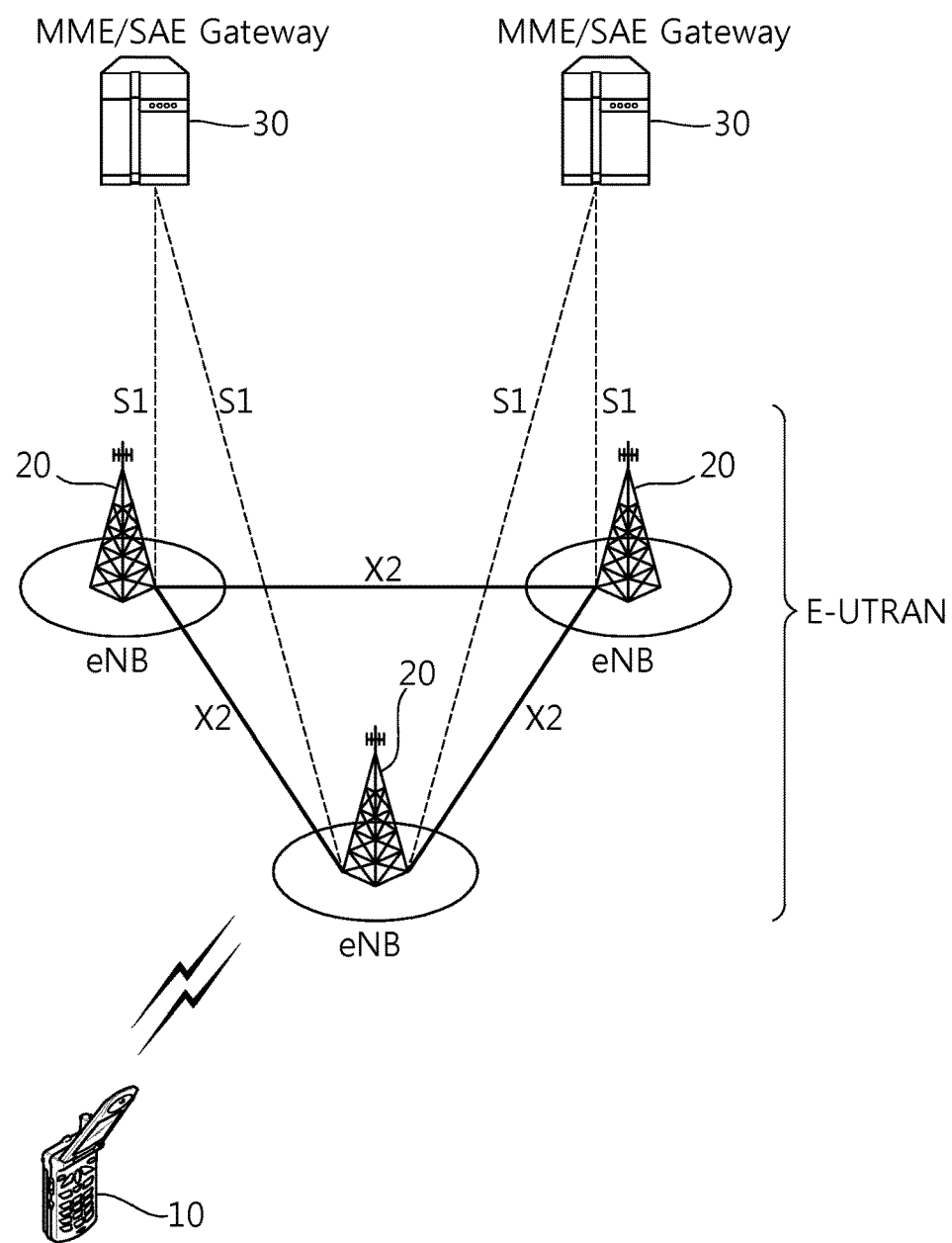
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
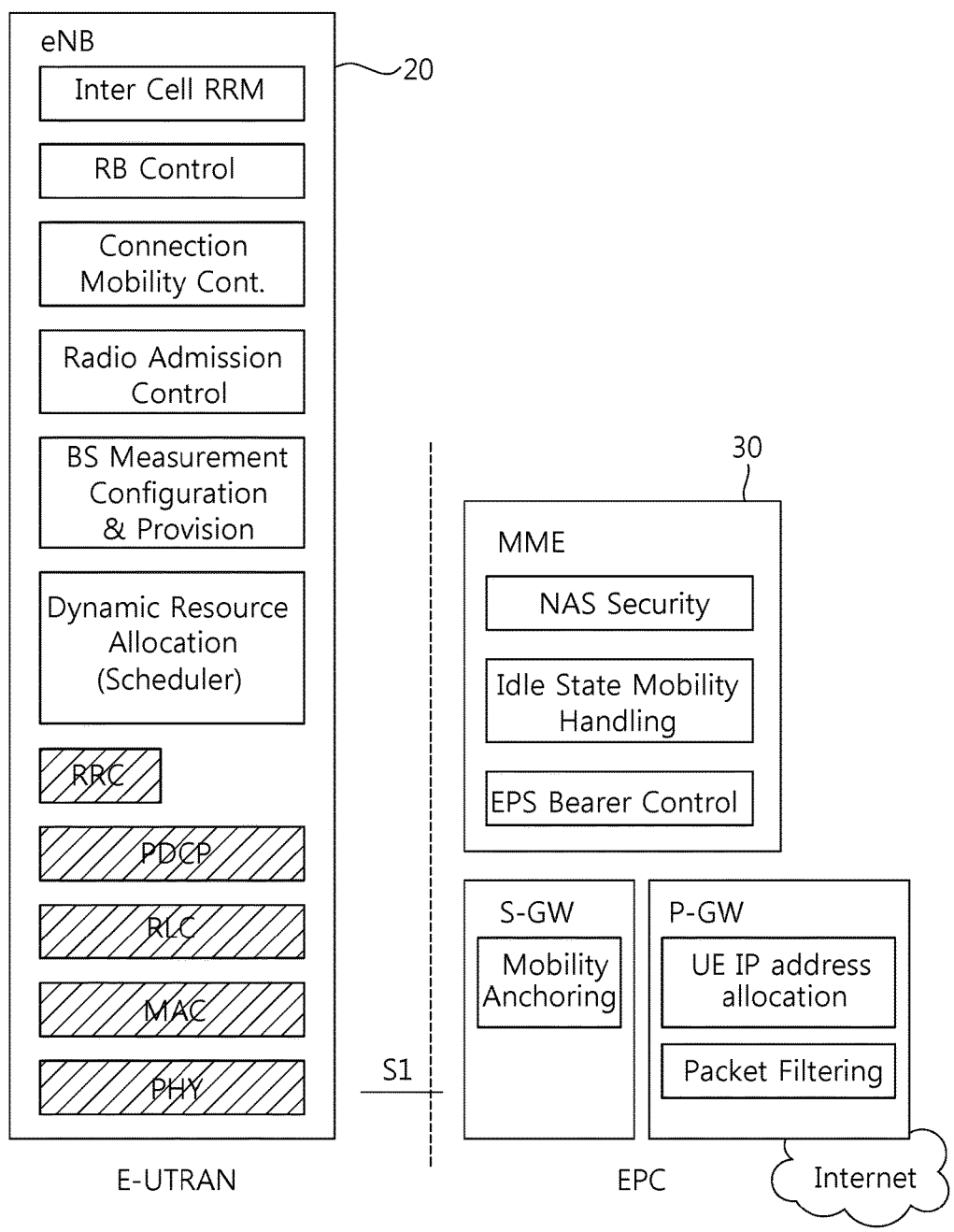
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
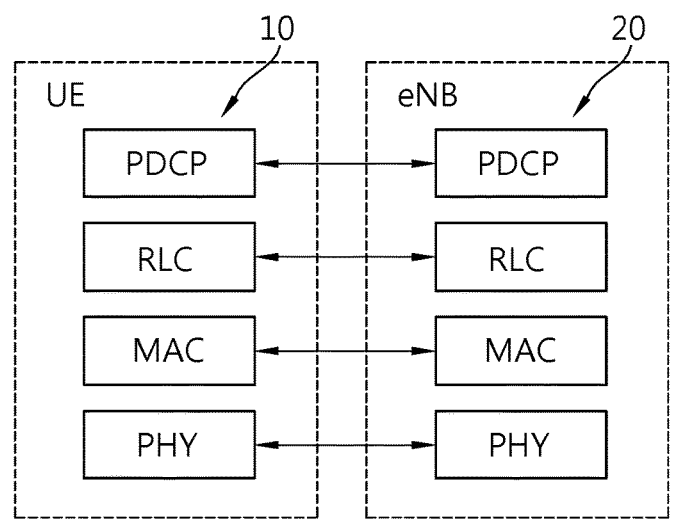
FIG. 3 shows a block diagram of a user plane protocol stack of an LTE system.
Figure 4:
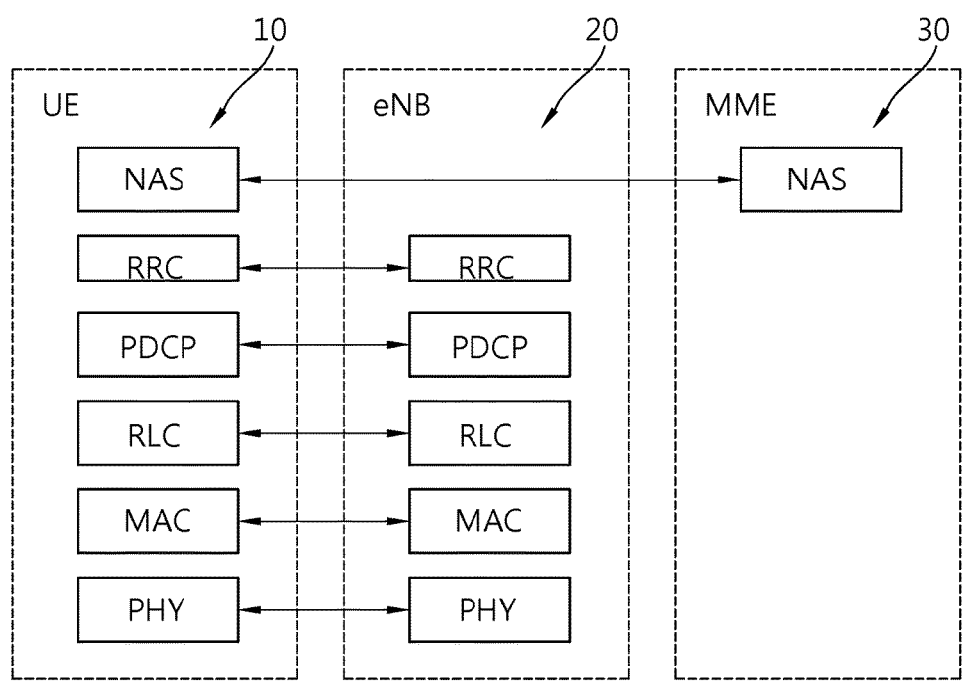
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
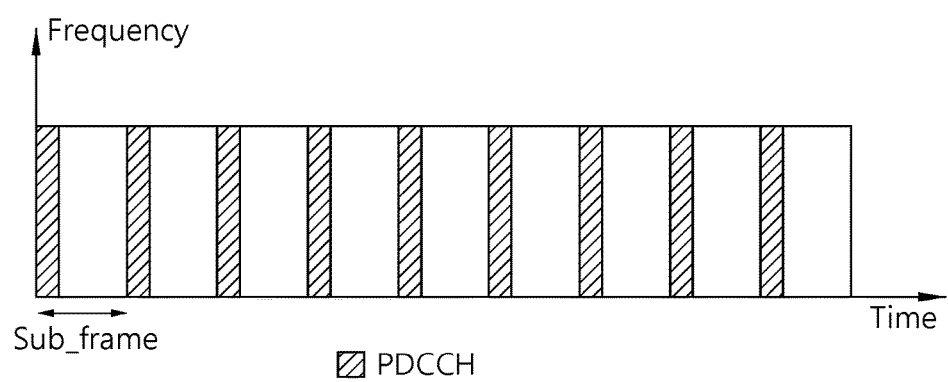
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Minimization of drive tests (MDT) is described. In may be referred to 3GPP TS 37.320 V11.3.0 (2013-03) and Section 5.6.6 and 5.6.8 of 3GPP TS 36.331 V11.5.0 (2013-09). The general principles and requirements guiding the definition of functions for MDT are the following.

1. MDT mode: There are two modes for the MDT measurements, which are logged MDT and immediate MDT. The logged MDT is MDT functionality involving measurement logging by the UE in IDLE mode, CELL_PCH and URA_PCH states (when the UE is in UTRA) for reporting to eNB/radio network controller (RNC) at a later point in time. The immediate MDT is MDT functionality involving measurements performed by the UE in CONNECTED state and reporting of the measurements to eNB/RNC available at the time of reporting condition as well as measurements by the network for MDT purposes. There are also cases of measurement collection not specified as either immediate or logged MDT, such as accessibility measurements.

2. UE measurement configuration: It is possible to configure MDT measurements for the UE logging purpose independently from the network configurations for normal radio resource management (RRM) purposes. However, in most cases, the availability of measurement results is conditionally dependent on the UE RRM configuration.

3. UE measurement collection and reporting: UE MDT measurement logs consist of multiple events and measurements taken over time. The time interval for measurement collection and reporting is decoupled in order to limit the impact on the UE battery consumption and network signaling load.

4. Geographical scope of measurement logging: It is possible to configure the geographical area where the defined set of measurements shall be collected.

5. Location information: The measurements shall be linked to available location information and/or other information or measurements that can be used to derive location information.

6. Time information: The measurements in measurement logs shall be linked to a time stamp.

7. UE capability information: The network may use UE capabilities to select terminals for MDT measurements.

8. Dependency on self-optimizing network (SON): The solutions for MDT are able to work independently from SON support in the network. Relation between measurements/solution for MDT and UE side SON functions shall be established in a way that re-use of functions is achieved where possible.

9. Dependency on TRACE: The subscriber/cell trace functionality is reused and extended to support MDT. If the MDT is initiated toward to a specific UE (e.g., based on international mobile subscriber identity (IMSI), international mobile station equipment identity (IMEI) software version (SV), etc.), the signalling based trace procedure is used, otherwise the management based trace procedure (or cell traffic trace procedure) is used.

The solutions for MDT shall take into account the following constraints:

1. UE measurements: The UE measurement logging mechanism is an optional feature.

In order to limit the impact on UE power consumption and processing, the UE measurement logging should as much as possible rely on the measurements that are available in the UE according to radio resource management enforced by the access network.

2. Location information: The availability of location information is subject to UE capability and/or UE implementation. Solutions requiring location information shall take into account power consumption of the UE due to the need to run its positioning components.

Logged MDT procedure is described. Support of logged MDT complies with the principles for idle mode measurements in the UE. Furthermore, measurement logging is differentiated based on UE states in idle mode, i.e. camped normally, any cell selection or camped on any cell. The UE shall perform measurement logging in "camped normally" state. In "any cell selection" and "camped on any cell" state the UE is not required to perform MDT measurement logging (including time and location information). For logged MDT, the configuration, measurement collection and reporting of the concerning measurement will always be done in cells of the same RAT type.

Figure 6:
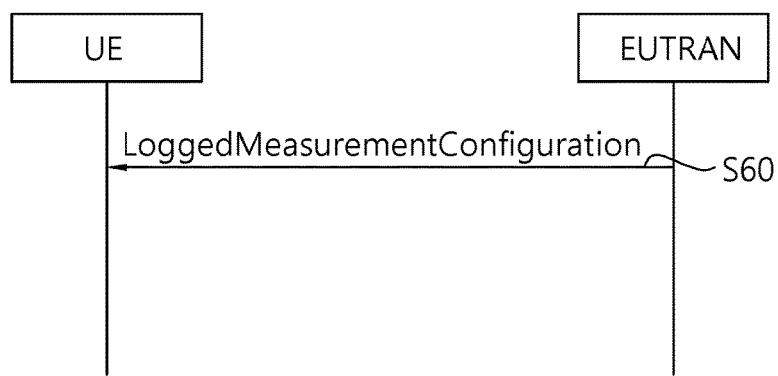
FIG. 6 shows a logged measurement configuration procedure.

FIG. 6 shows a logged measurement configuration procedure. The purpose of the logged measurement procedure is to configure the UE to perform logging of measurement results while in RRC_IDLE. The logged measurement procedure applies to logged measurements capable UEs that are in RRC_CONNECTED. In step S60, the E-UTRAN initiates the logged measurement configuration procedure to the UE in RRC_CONNECTED by sending the LoggedMeasurementConfiguration message, which is used to transfer configuration parameters for logged MDT. This is a unidirectional RRC signaling procedure. A release operation for logged measurement configuration in the UE is realized only by configuration replacement when the configuration is overwritten or by configuration clearance in case a duration timer stopping or expiration condition is met.

Upon receiving the LoggedMeasurementConfiguration message, the UE shall:
1> discard the logged measurement configuration as well as the logged measurement information;
1> store the received loggingDuration, loggingInterval and areaConfiguration, if included, in VarLogMeasConfig;
1> if the LoggedMeasurementConfiguration message includes plmn-IdentityList;
2> set plmn-IdentityList in VarLogMeasReport to include the registered PLMN (RPLMN) as well as the PLMNs included in plmn-IdentityList;
1> else:
2> set plmn-IdentityList in VarLogMeasReport to include the RPLMN;
1> store the received absoluteTimeInfo, traceReference, traceRecordingSessionRef and tce-Id in VarLogMeasReport;
1> start timer T330 with the timer value set to the loggingDuration;

Upon expiry of T330, the UE shall:
1> release VarLogMeasConfig;

The UE is allowed to discard stored logged measurements, i.e. to release VarLogMeasReport 48 hours after T330 expiry.

Release of logged measurement configuration procedure may release the logged measurement configuration as well as the logged measurement information. The UE shall initiate the release of logged measurement configuration procedure upon receiving a logged measurement configuration in another RAT. The UE shall also initiate the procedure upon power off or detach. The UE shall:

1> stop timer T330, if running;
1> if stored, discard the logged measurement configuration as well as the logged measurement information, i.e. release the UE variables VarLogMeasConfig and VarLogMeasReport;

Measurements logging procedure specifies the logging of available measurements by a UE in RRC_IDLE that has a logged measurement configuration. While T330 is running, the UE shall:

1> perform the logging in accordance with the following:
2> if the UE is camping normally on an E-UTRA cell and if the RPLMN is included in plmn-IdentityList stored in VarLogMeasReport and, if the cell is part of the area indicated by areaConfiguration if configured in VarLogMeasConfig:
3> perform the logging at regular time intervals, as defined by the loggingInterval in VarLogMeasConfig;
2> when adding a logged measurement entry in VarLogMeasReport, include the fields in accordance with the following:
3> set the relativeTimeStamp to indicate the elapsed time since the moment at which the logged measurement configuration was received;
3> if detailed location information became available during the last logging interval, set the content of the locationInfo as follows:
4> include the locationCoordinates;
4> if available, include the uncertainty;
4> if available, include the confidence;
3> set the servCellIdentity to indicate global cell identity of the cell the UE is camping on;
3> set the measResultServCell to include the quantities of the cell the UE is camping on;
3> if available, set the measResultNeighCells, in order of decreasing ranking-criterion as used for cell re-selection, to include neighbouring cell measurements that became available during the last logging interval for at most the following number of neighbouring cells; 6 intra-frequency and 3 inter-frequency neighbours per frequency as well as 3 inter-RAT neighbours, per frequency/set of frequencies (GERAN) per RAT;
2> when the memory reserved for the logged measurement information becomes full, stop timer T330 and perform the same actions as performed upon expiry of T330;

MBMS is described. It may be referred to Section 15 of 3GPP TS 36.300 V11.7.0 (2013-09) and Section 5.8 of 3GPP TS 36.331 V11.5.0 (2013-09).

Figure 7:
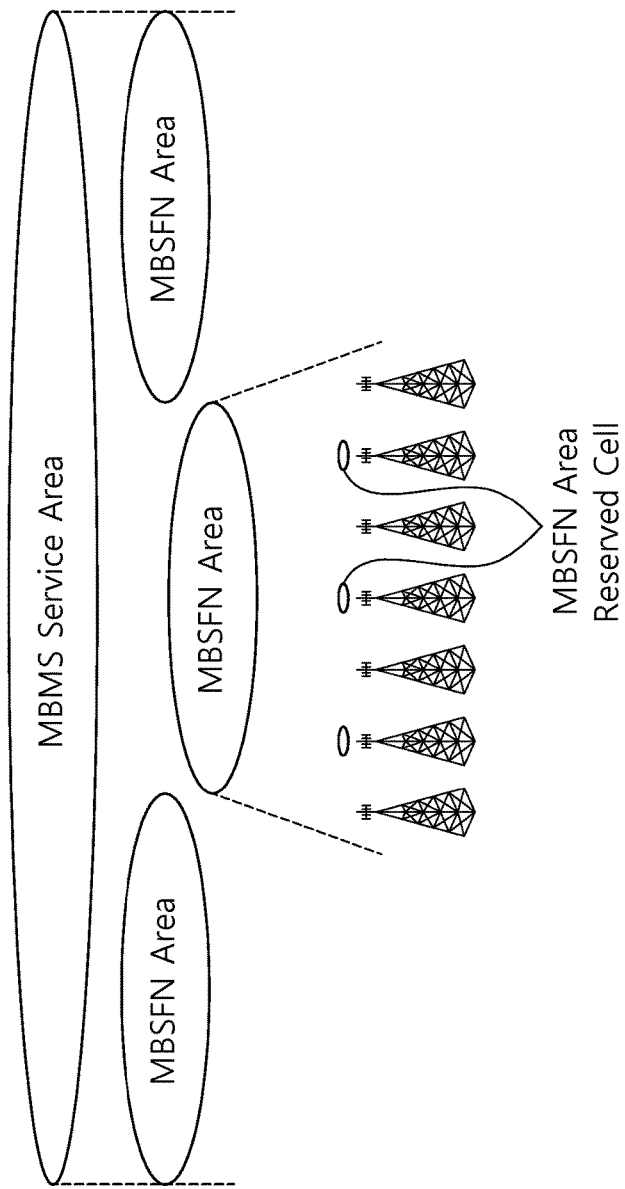
FIG. 7 shows MBMS definitions.

FIG. 7 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

The following principles govern the MCCH structure:
One MBSFN area is associated with one MCCH and one MCCH corresponds to one MBSFN area;
The MCCH is sent on MCH;
MCCH consists of a single MBSFN area configuration RRC message which lists all the MBMS services with ongoing sessions and an optional MBMS counting request message;
MCCH is transmitted by all cells within an MBSFN area, except the MBSFN area reserved cells;
MCCH is transmitted by RRC every MCCH repetition period;
MCCH uses a modification period;
A notification mechanism is used to announce changes of MCCH due to either session start or the presence of an MBMS counting request message: The notification is sent periodically throughout the modification period preceding the change of MCCH, in MBSFN subframes configured for notification. The downlink control information (DCI) format 1C with MBMS radio network temporary identity (M-RNTI) is used for notification and includes an 8-bit bitmap to indicate the one or more MBSFN area(s) in which the MCCH change(s). The UE monitors more than one notification subframe per modification period. When the UE receives a notification, it acquires the MCCH at the next modification period boundary;
The UE detects changes to MCCH which are not announced by the notification mechanism by MCCH monitoring at the modification period.

In general, the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. An MBMS capable UE may be only required to support reception of a single MBMS service at a time. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH, i.e. both the time domain scheduling as well as the lower layer configuration are semi-statically configured, as defined within SystemInformationBlockType13.

For MBMS user data, which is carried by the MTCH logical channel, E-UTRAN periodically provides MSI at lower layers (MAC). This MCH information only concerns the time domain scheduling, i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by system frame number (SFN) values for which SFN mod m=0, where m is the number of radio frames comprising the modification period. The modification period is configured by means of SystemInformationBlockType13.

Figure 8:
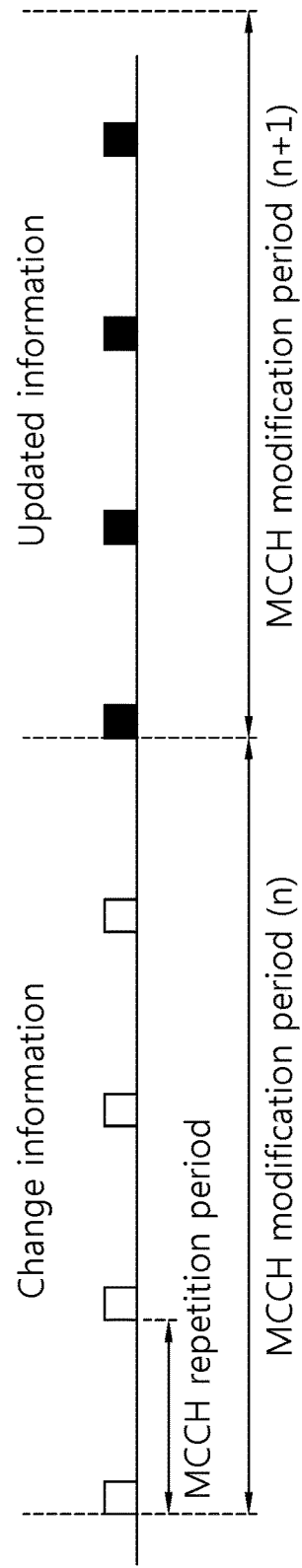
FIG. 8 shows change of MCCH information.

FIG. 8 shows change of MCCH information. When the network changes (some of) the MCCH information, it notifies the UEs about the change during a first modification period. In the next modification period, the network transmits the updated MCCH information. In FIG. 8, different colors indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI, on PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided, e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only. These MCCH information change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

The E-UTRAN may modify the MBMS configuration information provided on MCCH at the same time as updating the MBMS configuration information carried on BCCH, i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service shall acquire the MCCH information from the start of each modification period. A UE that is not receiving an MBMS service, as well as UEs that are receiving an MBMS service but potentially interested to receive other services not started yet in another MBSFN area, shall verify that the stored MCCH information remains valid by attempting to find the MCCH information change notification at least notificationRepetitionCoeff times during the modification period of the applicable MCCH(s), if no MCCH information change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

The UE applies the MCCH information acquisition procedure to acquire the MBMS control information that is broadcasted by the E-UTRAN. The procedure applies to MBMS capable UEs that are in RRC_IDLE or in RRC_CONNECTED.

A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH, which corresponds with the service that is being received, at the start of each modification period.

Unless explicitly stated otherwise in the procedural specification, the MCCH information acquisition procedure overwrites any stored MCCH information, i.e. delta configuration is not applicable for MCCH information and the UE discontinues using a field if it is absent in MCCH information unless explicitly specified otherwise.

Figure 9:
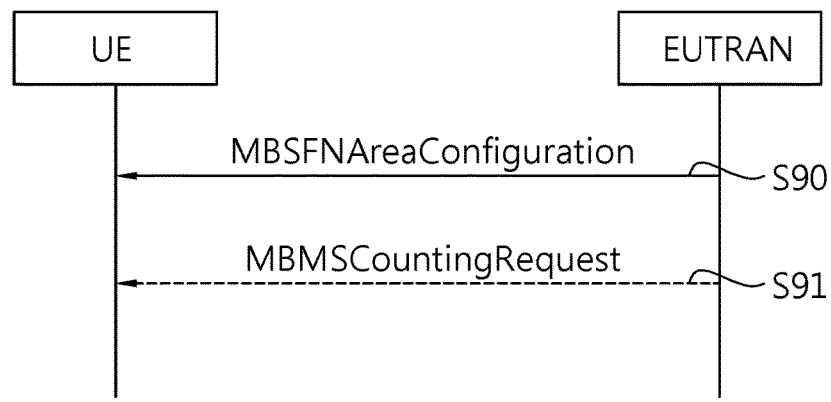
FIG. 9 shows a MCCH information acquisition procedure.

FIG. 9 shows a MCCH information acquisition procedure. An MBMS capable UE shall:

1> if the procedure is triggered by an MCCH information change notification:

2> start acquiring the MBSFNAreaConfiguration message (in step S90) and the MBMSCountingRequest message if present (in step S91), from the beginning of the modification period following the one in which the change notification was received;
1> if the UE enters an MBSFN area:
2> acquire the MBSFNAreaConfiguration message (in step S90) and the MBMSCountingRequest message if present (in step S91), at the next repetition period;
1> if the UE is receiving an MBMS service:
2> start acquiring the MBSFNAreaConfiguration message (in step S90) and the MBMSCountingRequest message if present (in step S91), that both concern the MBSFN area of the service that is being received, from the beginning of each modification period;

Logged MDT procedure may be performed for MBMS. Hereinafter, the logged MDT procedure for MBMS may be referred to as MBMS-MDT. For MBMS-MDT, the logged measurement configuration procedure for described in FIG. 6 may be performed in order to log of measurement results for MBSFN in both RRC_IDLE and RRC_CONNECTED. Further, for MBMS-MDT, the measurements logging procedure specifies the logging of available measurements by a UE in RRC_IDLE that has a logged measurement configuration and the logging of available measurements by a UE in both RRC_IDLE and RRC_CONNECTED if targetMB-SFN-AreaList is included in VarLogMeasConfig.

MDT configuration message, i.e. the LoggedMeasurementConfiguration message, is transmitted via DCCH, as shown in FIG. 6. Accordingly, MBMS-MDT configuration message may be also transmitted via DCCH. Alternatively, the MBMS-MDT configuration message may be transmitted via MCCH. Meanwhile, the UE which is interested to receive MBMS service does not need to read all MCCHs that are configured. That is, the UE may read only an MCCH corresponding to the interested MBMS service. But the MBMS-MDT configuration message may be transmitted via only one MCCH among multiple MCCHs, and accordingly, the MBMS-MDT configuration message may be transmitted via an MCCH not corresponding to the interested MBMS service.

In order to solve the problem described above, when multiple MCCHs, which corresponds to multiple MBSFN areas respectively, are configured and the MBMS-MDT configuration is transmitted via one MCCH among the multiple MCCHs, a method for configuring MBMS-MDT according to an embodiment of the present invention is described below. According to an embodiment of the present invention, a representative MCCH for MBMS-MDT configuration may be defined, and a representative MCCH indicator indicating the representative MCCH may be also defined. Therefore, the UE may always read the representative MCCH which carries the MBMS-MDT configuration.

Figure 10:
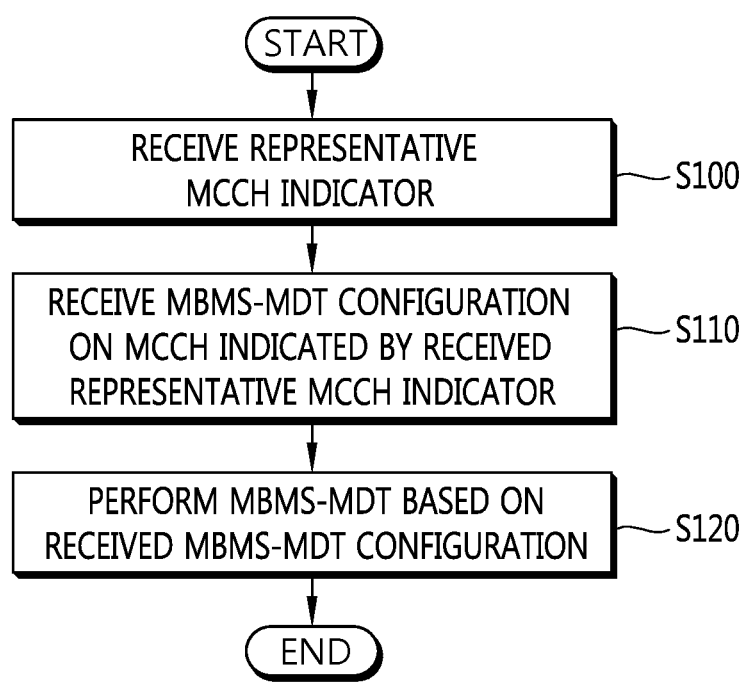
FIG. 10 shows an example of a method for configuring MBMS-MDT according to an embodiment of the present invention.

FIG. 10 shows an example of a method for configuring MBMS-MDT according to an embodiment of the present invention.

In step S100, the UE receives the representative MCCH indicator from the network. The representative MCCH indicator may indicate which MCCH is the representative MCCH among all MCCHs that are configured. That is, the representative MCCH carries the MBMS-MDT configuration. The UE may know the representative MCCH by receiving the representative MCCH indicator. The representative MCCH indicator may be received via SystemInformationBlockType13.

In step S110, the UE receives the MBMS-MDT configuration on the representative MCCH, which is indicated by the representative MCCH indicator, among multiple MCCHs from the network. The MBMS-MDT configuration may include at least one of logging duration, logging interval, MBMS measurement duration, MBMS measurement interval, or MBSFN area identity list. The MBMS-MDT configuration may be transmitted via only one MCCH per frequency, though multiple MCCHs are configured on a frequency. The MBMS-MDT configuration may include information related to MBMS-MDT, for up to 8 MBSFN areas. The MBMS-MDT configuration may be included in the existing MBSFNAreaConfiguration message or may be transmitted via newly defined MBMS-MDT configuration message.

The MBMS-MDT configuration may be received by various methods. The UE may monitor the MBMS-MDT configuration change notification for representative MCCH, even though any MBMS services the UE is interested in are not provided by the MBSFN area corresponding to the representative MCCH. If the MCCH information acquisition procedure is triggered by the MBMS-MDT configuration change notification, the UE may start acquiring the MBMS-MDT configuration on the representative MCCH from the beginning of the modification period following the one in which the MBMS-MDT configuration change notification was received. In detail, when the network changes the MBMS-MDT configuration, it notifies the UEs about the change during a first modification period. In the next modification period, the network transmits the updated MBMS-MDT configuration. Upon receiving the MBMS-MDT configuration change notification, the UE interested to receive MBMS services acquires the new MBMS-MDT configuration immediately from the start of the next modification period. The UE applies the previously acquired MBMS-MDT configuration until the UE acquires the new MBMS-MDT configuration. An indication of an MBMS specific RNTI, i.e. M-RNTI, on PDCCH may be used to inform UEs in RRC_IDLE and UEs in RRC_CONNECTED about an MBMS-MDT configuration change. The indication on PDCCH may have a size of 1-bit. If the bit is set to "1", it may indicate that the MBMS-MDT configuration will change at the next modification period.

Alternatively, if the UE enters an MBSFN area, the UE may acquire the MBMS-MDT configuration on the representative MCCH, at the next repetition period. Alternatively, if the UE is receiving an MBMS service, the UE may start acquiring the MBSFNAreaConfiguration message and the MBMSCountingRequest message if present, that both concern the MBSFN area of the service that is being received, and may start acquiring the MBMS-MDT configuration from the representative MCCH if present, from the beginning of each modification period.

In step S120, the UE performs MBMS-MDT based on the received MBMS-MDT configuration. Performing of the MBMS-MDT may include performing MBMS measurements, logging measurement results, and reporting logged results. The MBMS measurements to be performed by the UE for the MBMS-MDT may include MBSFN reference signal received power (RSRP)/reference signal received quality (RSRQ) per MBSFN area, MCH block error rate (BLER) per MCS, per MCH, and per MBSFN area, and/or the amount of received RLC SDUs for a certain period of time.

Upon receiving the MBMS-MDT configuration, the UE may reconfigure the MBMS-MDT. Upon deciding to perform MBMD-MDT reconfiguration, the UE may perform discarding the logged measurement configuration as well as the logged measurement information, storing the received information included in the MBMS-MDT configuration, and starting timer related to logging duration.

Figure 11:
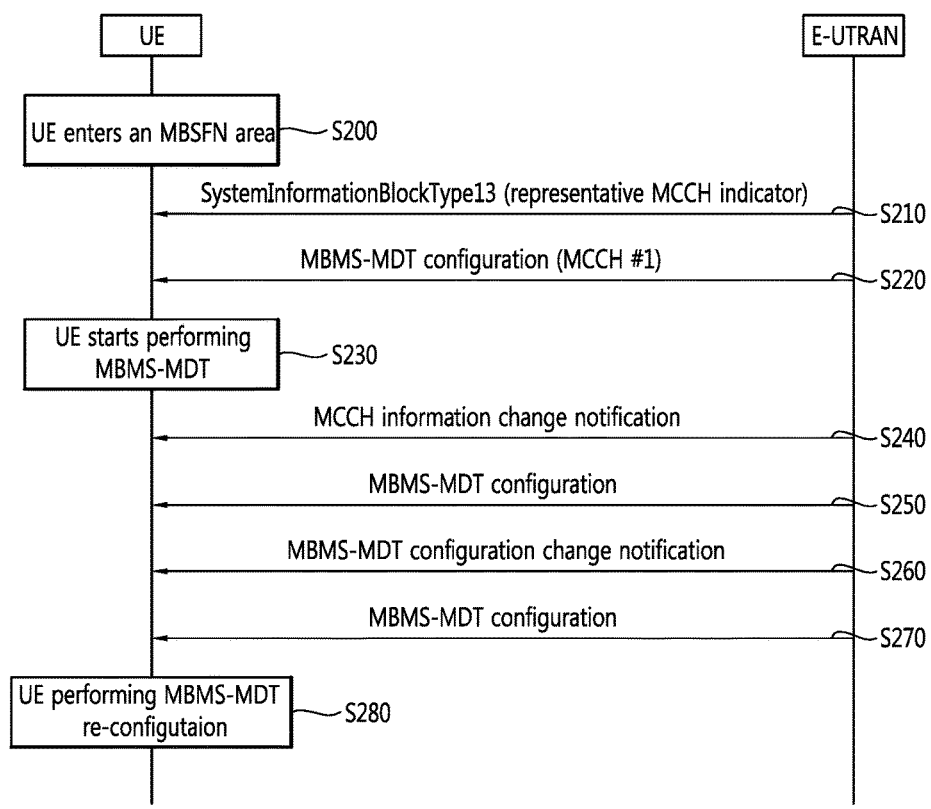
FIG. 11 shows another example of a method for configuring MBMS-MDT according to an embodiment of the present invention.

FIG. 11 shows another example of a method for configuring MBMS-MDT according to an embodiment of the present invention.

In step S200, the UE enters an MBSFN area. It is assumed that the UE is interested in an MBMS service and knows that the MBMS service is provided on MCCH #3 corresponding to MBSFN area #3. It is further assumed that the representative MCCH corresponds to MBSFN area #1.

In step S210, the UE receives the representative MCCH indicator via system information block type 13.

In step S220, if the UE support MBMS-MDT, the UE reads the representative MCCH, which is indicated by the representative MCCH indicator, on MBSFN area #1 as well as the MCCH #3 corresponding to MBSFN area #3 to acquire the MBMS-MDT configuration.

In step S230, the UE starts receiving the interested MBMS service from MBSFN area #3 while performing MBMS-MDT on MBSFN area #3 based on the received MBMS-MDT configuration.

In step S240, the UE receives the MCCH information change notification which indicates that the representative MCCH is changed. But, it is assumed that the MBMS-MDT configuration change notification bit is set to '0' (i.e. MBMS-MDT configuration does not change).

In step S250, if the UE is interested to receive a MBMS service on MBSFN area #1, the UE reads the representative MCCH and there is an MBMS-MDT configuration. But the UE ignores the MBMS-MDT configuration and does not perform the MBMS-MDT reconfiguration, since the MBMS-MDT configuration does not change. If the UE is not interested to receive a MBMS service on MBSFN area #1, the UE is allowed to ignore MCCH information change notification which indicates the representative MCCH is changed.

In step S260, the UE receives the MBMS-MDT configuration change notification which is set to '1' (i.e. MBMS MDT configuration changes).

In step S270, if the UE support MBMS-MDT, the UE reads the representative MCCH and acquires the MBMS-MDT configuration. The UE start performing MBMS-MDT reconfiguration according to the received new MBMS-MDT configuration.

For another embodiment of the present invention, upon receiving the MBMS-MDT configuration from the network via MCCH, the UE may start to perform MBMS-MDT for an MBSFN area corresponding to the MCCH. And, upon receiving the MBMS-MDT release message from the network via MCCH, the UE may stop to perform MBMS-MDT for an MBSFN area corresponding to the MCCH and releases the MBMS-MDT configuration received via the MCCH. For the UE which is performing the MBMS-MDT, if the UE receives the MBMS-MDT configuration via MCCH and the UE is not performing MBMS-MDT for corresponding MBSFN area, UE may start to perform MBMS-MDT for the MBSFN area additionally. For the UE which is performing the MBMS-MDT for multiple MBSFN areas, if the UE receives the MBMS-MDT release message via MCCH and the UE is performing MBMS-MDT for corresponding MBSFN area, the UE may stop to perform MBMS-MDT only for an MBSFN area corresponding to the MCCH and releases the MBMS-MDT configuration received via the MCCH.

In this case, the MBMS-MDT configuration may further include timer T330m, and/or ON/OFF indicator. Upon receiving the MBMS-MDT configuration, the UE may start T330m. Upon log volume exceeding the suitable UE memory, or upon initiating the release of MBMS-MDT configuration procedure, the UE may stop T330m. Upon expiry of T330m, the UE may release MBMS-MDT configuration and stop to perform the MBMS-MDT. T330m may be configured by the network, or may be pre-defined. T330m may be configured per MBSFN area or MCCH. If the MBMS-MDT configuration includes ON indicator, the UE may start to perform MBMS-MDT. If the MBMS-MDT configuration includes OFF indicator, the UE may stop to perform MBMS-MDT. The MBMS-MDT configuration message including OFF indicator may replace the MBMS-MDT release message.

Figure 12:
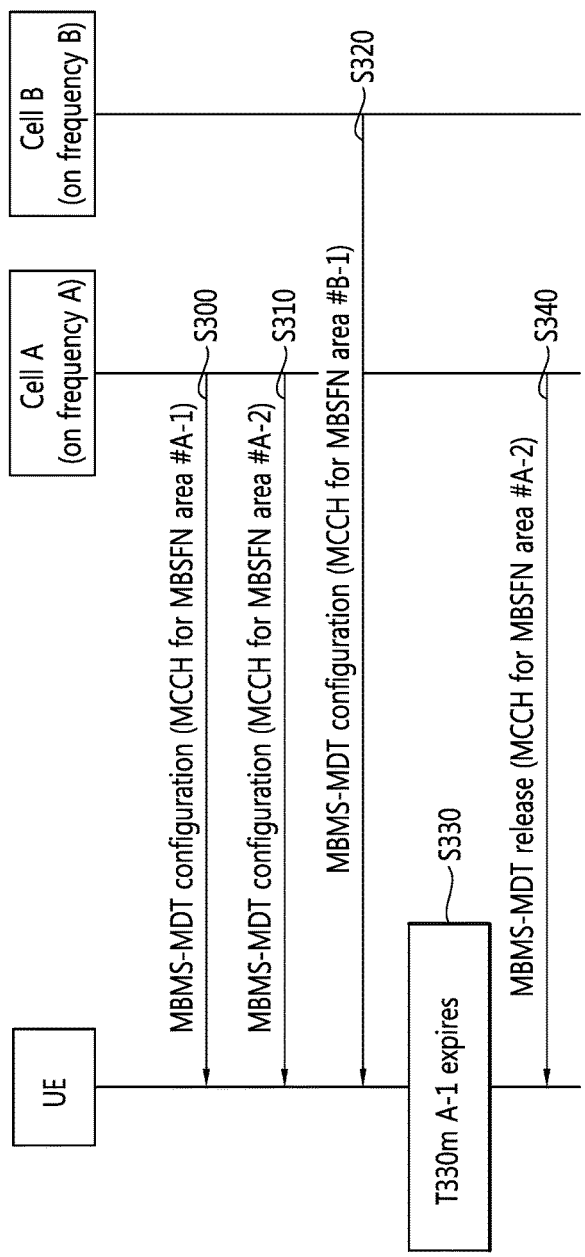
FIG. 12 shows another example of a method for configuring MBMS-MDT according to an embodiment of the present invention.

FIG. 12 shows another example of a method for configuring MBMS-MDT according to an embodiment of the present invention.

In step S300, the UE is receiving MBMS services from MBSFN area #A-1, #A-2 and #B-1.

In step S310, the UE receives the MBMS-MDT configuration via MCCH corresponding to MBSFN area #A-1. The UE starts to perform MBMS-MDT for MBSFN area #A-1 and starts T330m A-1.

In step S320, the UE receives the MBMS-MDT configuration via MCCH corresponding to MBSFN area #A-2. The UE keeps performing MBMS-MDT for MBSFN area #A-1 and starts to perform MBMS-MDT for MBSFN area #A-2. The UE starts T330m A-2.

In step S330, the UE receives the MBMS-MDT configuration via MCCH corresponding to MBSFN area #B-1. The UE keeps performing MBMS-MDT for MBSFN area #A-1 and #A-2 and starts to perform MBMS-MDT for MBSFN area #B-1. The UE starts T330m B-1.

In step S340, upon expiry of T330m A-1, the UE releases MBMS-MDT configuration received via MCCH corresponding to MBSFN area #A-1 and stop to perform the MBMS-MDT only for MBSFN area #A-1. The UE keeps performing MBMS-MDT for MBSFN area #A-2 and #B-1.

In step S350, upon receiving the MBMS-MDT release message via MCCH corresponding to MBSFN area #A-2, the UE releases MBMS-MDT configuration received via MCCH corresponding to MBSFN area #A-2 and stop to perform the MBMS-MDT only for MBSFN area #A-2. The UE keeps performing MBMS-MDT for MBSFN area #B-1.

Figure 13:
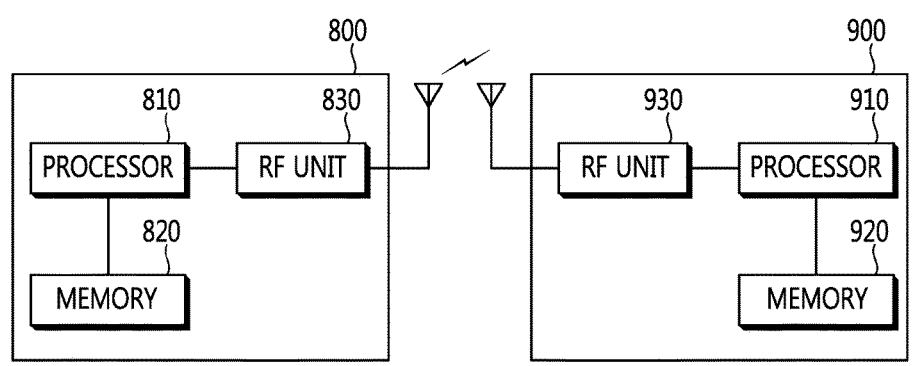
FIG. 13 shows a wireless communication system to implement an embodiment of the present invention.

FIG. 13 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for configuring, by a user equipment (UE), multimedia broadcast multicast service (MBMS) minimization of drive test (MDT) in a wireless communication system, the method comprising:
   receiving a representative multicast control channel (MCCH) indicator, which indicates a first MCCH among multiple MCCHs, from a network via a system information block type 13;
   receiving a MBMS-MDT configuration by reading the first MCCH based on the representative MCCH indicator;
   performing MBMS-MDT based on the received MBMS-MDT configuration, upon receiving an interested MBMS service from a multicast broadcast single frequency network (MBSFN) area corresponding to a second MCCH among the multiple MCCHs;
   receiving a MBMS-MDT configuration change notification which indicates the MBMS-MDT configuration is changed;
   receiving a new MBMS-MDT configuration by reading the first MCCH; and
   performing MBMS-MDT reconfiguration according to the new MBMS-MDT configuration.

2. The method of claim 1, wherein the MBMS-MDT configuration is received at a next modification period following a modification period at which the MBMS-MDT configuration change notification is received.

3. The method of claim 1, wherein the MBMS-MDT configuration change notification is indicated by an indicator on a physical downlink control channel (PDCCH).

4. The method of claim 3, wherein the indicator on the PDCCH is 1-bit.

5. The method of claim 1, wherein the MBMS-MDT configuration is received upon entering a multicast broadcast single frequency network (MBSFN) area.

6. The method of claim 1, wherein the MBMS-MDT configuration is received upon receiving a MBSFN area configuration message and a MBMS counting request message from the network.

7. The method of claim 1, wherein the MBMS-MDT configuration includes at least one of a logging duration, a logging interval, a MBMS measurement duration, a MBMS measurement interval, or a MBSFN area identity list.

8. The method of claim 1, wherein performing the MBMS-MDT comprises performing MBMS measurements, logging measurement results and reporting logged results.

9. The method of claim 8, wherein the MBMS measurements includes at least one of a MBSFN reference signal received power (RSRP) per MBSFN area, a MBSFN reference signal received quality (RSRQ) per MBSFN area, multicast channel (MCH) block error rate (BLER) per modulation and coding scheme (MCS), per MCH, and per MBSFN area, or amount of received radio link control (RLC) service data units (SDUs) for a certain period of time.

10. The method of claim 1, wherein performing the MBMS-MDT comprises performing MBMS-MDT reconfiguration.

11. The method of claim 10, wherein performing the MBMS-MDT reconfiguration comprises at least one of discarding logged measurement configuration as well as logged measurement information, storing information included in an MBMS-MDT configuration, or starting timer related to logging duration.

12. The method of claim 1, wherein the multiple MCCHs correspond to multiple MBSFN areas respectively.

13. A user equipment (UE) configured to configure multimedia broadcast multicast service (MBMS) minimization of drive test (MDT) in a wireless communication system, the UE comprising:
   a transceiver configured to transmit or received a radio signal; and
   a processor coupled to the transceiver, and configured to:
   receive a representative multicast control channel (MCCH) indicator, which indicates a first MCCH among multiple MCCHs, from a network via a system information block type 13;
   receive a MBMS-MDT configuration by reading the first MCCH based on the representative MCCH indicator;
   perform MBMS-MDT based on the received MBMS-MDT configuration, upon receiving an interested MBMS service from a multicast broadcast single frequency network (MBSFN) area corresponding to a second MCCH among the multiple MCCHs;
   receive a MBMS-MDT configuration change notification which indicates the MBMS-MDT configuration is changed;
   receive a new MBMS-MDT configuration by reading the first MCCH; and
   perform MBMS-MDT reconfiguration according to the new MBMS-MDT configuration.

* * * * *